J. GOULDING.
MACHINE FOR GINNING COTTON AND BURRING WOOL.
No. 29,780. Patented Aug. 28, 1860.
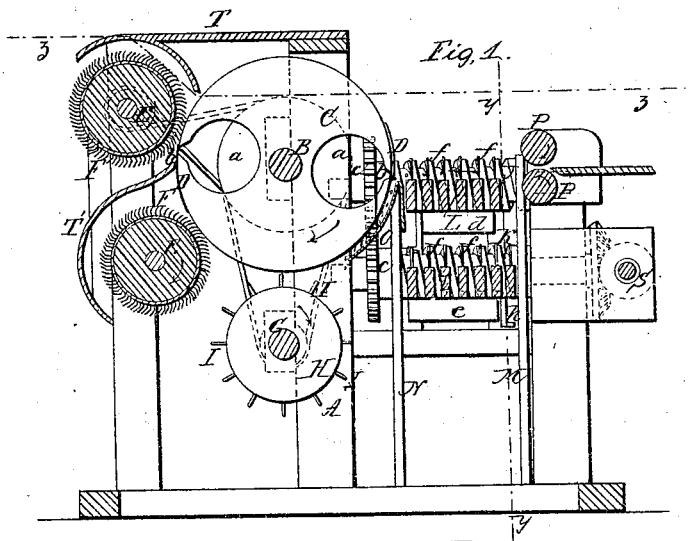
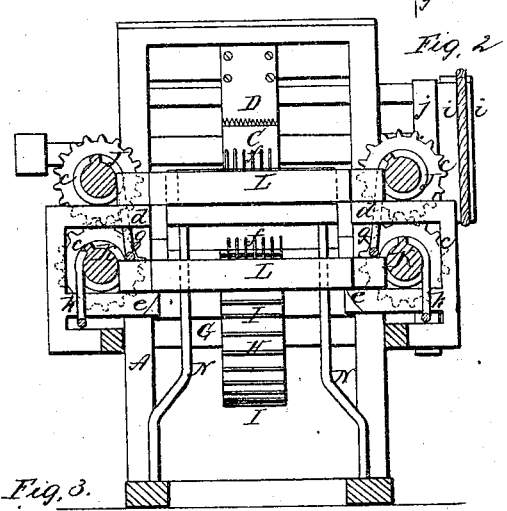
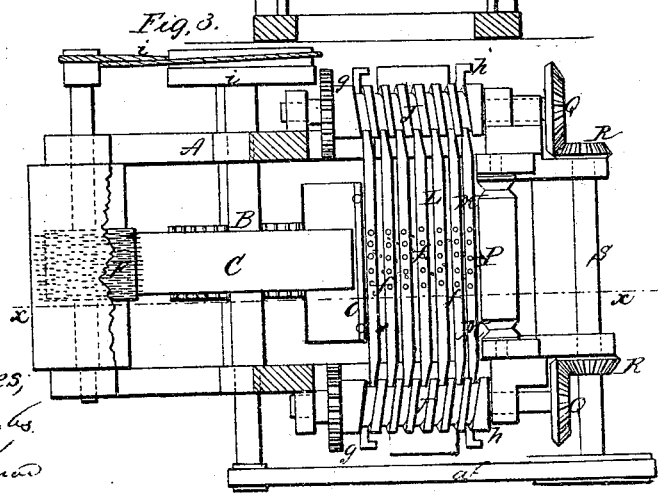

UNITED STATES PATENT OFFICE.

JOHN GOULDING, OF NORTH WILBRAHAM, MASSACHUSETTS.

IMPROVEMENT IN COTTON-GINS.

Specification forming part of Letters Patent No. 29,780, dated August 28, 1860.

*To all whom it may concern:*

Be it known that I, JOHN GOULDING, of North Wilbraham, in the county of Hampden and State of Massachusetts, have invented a new and Improved Machine for Ginning Cotton and Burring Wool; and I do hereby declare that the following is a full, clear, and exact description of the same, reference being had to the annexed drawings, making a part of this specification, in which—

Figure 1 is a side sectional view of my invention, taken in the line $x\ x$, Fig. 3; Fig. 2, an end sectional view of the same, taken in the line $y\ y$, Fig. 1; Fig. 3, a plan sectional view of the same, taken in the line $z\ z$, Fig. 1.

Similar letters of reference indicate corresponding parts in the several figures.

The object of this invention is to obtain a machine by which cotton may be ginned or separated from its seed, and burrs also separated from wool, the machine performing its work in the most efficient manner without injuring the fiber of either the cotton or wool, but leaving the same in a loose, light state, most favorable for subsequent manufacture.

To enable those skilled in the art to make and use my invention, I will proceed to describe its construction and operation.

A represents a framing, which may be constructed in any proper way to support the working parts of the machine, and B is a driving-shaft placed transversely in the upper part of the frame.

On the shaft B, at about its center, there is placed a wheel, C, having two circular holes, $a\ a$, made through it near its periphery, and at opposite sides of its shaft B, and to the periphery of wheel C there are attached two combs, D D, the teeth of which project over slots $b$, which extend through from the periphery of wheel C to the holes $a$. (See Fig. 1.) The combs D are formed of steel plates, and are curved corresponding to the curvature of the periphery of the wheel C, the teeth of the combs being formed by serrating their edges. (See Fig. 2.) The slots $b$ and holes $a$ form throats for the combs, and allow all dust, dirt, and fine particles to escape from the teeth, thereby preventing choking or clogging of the same, and insuring a thorough operation of them at all times.

In the frame A there are also placed two shafts, E E, one over the other, and each provided with a stripper, F, formed of wire teeth, which are just in contact with the periphery of wheel C, as shown clearly in Fig. 1.

In the frame A, below the wheel C, there is placed a shaft, G, having a wheel, H, above it, to the periphery of which a series of radial plates or beaters, I, is attached, the beaters, as they rotate, just clearing the periphery of wheel C, as shown in Fig. 1.

At the front part of the frame A, and at each side, there are placed two pairs of screws, J K, the screws J being over the screws K, and each pair connected by toothed wheels $c\ c$. The lower screws, K, have horizontal bars or plates $d$ above them, and horizontal bars or plates $e$ below them. (See more particularly Fig. 2.) These bars or plates $d\ e$ form supports for a series of plates, L, the ends of which are fitted between the threads of the screws J K. (See Figs. 1 and 3.) The upper edges of the plates L are provided with vertical teeth or spurs $f$, which are in line with the periphery of the wheel C. Each screw J K is provided with a projecting arm, the arms $g$ of the upper screws, J, being at their inner ends, and the arms $h$ of the lower screws, K, being at their outer ends.

M M are guide-rods, which are secured in the frame A and extend up at the outer side of the plates L; and N N are similar rods, which extend up at the inner sides of plates L and have an apron or concave plate, O, attached to their upper ends, the plate O being concentric with the wheel C.

P P are two feed-rollers, which are placed one over the other in the same plane, the bite of said rollers being on a level with the upper edges of the uppermost plates L.

To the outer ends of the axes of the lower screws, K, there are attached bevel-wheels Q, into which bevel-pinions R R on a shaft, S, gear, said shaft being driven by a belt, $a^*$, from shaft B. The stripper-shafts E are driven by belts $i$ from the shaft B, and the beater-shaft G is driven by a belt, $j$, from shaft B.

T is a guard-plate attached to the upper part of the frame A, and extending over the wheel C and upper stripper, F, and T' is a division-plate between the two strippers.

The operation is as follows: The shaft B is rotated by any convenient power, and the wheel C, strippers F, beater-wheel H, and screws J K are rotated in the direction indicated by the arrows upon them. The cotton to be ginned or the wool to be burred is passed between the rollers P P, which carry it to the spurs or teeth $f$ of the upper plates L, and said spurs or teeth, catching it, convey it to the revolving wheel C, the upper plates L being moved toward the wheel C by the upper screws, J, and as each plate L reaches the inner ends of the screws J their arms $g$ force it down, so that its ends will engage with the lower screws, K, which move the plates out toward the front end of the machine, and as each plate reaches the outer ends of the screws K the arms $h$ of the latter elevate them, so that they will engage with the upper screws, J. Thus it will be seen that plates L move continuously toward and from the wheel C, forming an endless series of plates, the rods M N retaining the plates in proper position and possessing a certain degree of elasticity, to yield as the plates are raised and lowered. The spurs or teeth $f$ of the plates have the cotton or wool stripped from them at the upper edge of the apron or concaved plate O, the combs D taking off their layers from the teeth of the innermost plate L. The majority of the seeds or burrs are detached from the cotton or wool at the top of the apron or concave; but if any should escape down between the wheel C and concave O, the beaters I will detach them. The cotton or wool is detached from the combs D by the strippers F F.

It will be understood that the speed of wheel C is quite rapid compared with the movements of the plate L, and the strippers F revolve much more rapidly than the wheel C. Each time a plate L is forced down by the arms $g$ of the upper screws, J, the concave or apron O is forced back by the elasticity of rods N, and all seeds or burrs are allowed to drop instantly, the concave or apron being moved forward by the forward movement of the plates. This movement of the concave or apron effectually prevents the choking or clogging of the machine. This mode of feeding serves to distend the fiber of the wool or cotton, and it is presented in a favorable manner to the action of the combs D. The cotton or wool is also discharged from the machine in a loose, light state, favorable for subsequent manufacture.

I do not claim, broadly, the employment or use of revolving strippers, nor revolving beaters, for they have been previously used for similar or analogous purposes. Neither do I claim, separately, the plates L and wheels C, provided with combs D; but I do claim as new and desire to secure by Letters Patent—

1. The concave or apron O, in connection with the toothed plates L and wheel C, said parts being constructed as shown, for the purpose described.

2. The combination of the toothed plates L, comb-wheel C, concave or apron O, stripper F, and beater-wheel H, said parts being constructed as shown, for the purpose set forth.

JOHN GOULDING.

Witnesses:
R. B. HILDRETH,
A. S. DAVIS.